Patented Mar. 29, 1949

2,465,900

UNITED STATES PATENT OFFICE 2,465,900

FLUORINATED DIALKYLBENZENES

Earl T. McBee, West Lafayette, and Ogden R. Pierce, La Fayette, Ind., assignors to Purdue Research Foundation, West Lafayette, Ind., a corporation of Indiana No Drawing. Application January 8, 1946, Serial No. 639,905

4 Claims. (Cl. 260—651)

This invention relates to certain halodialkylbenzenes and more particularly to the 1-polychlorofluoroisopropyl - 4 - (trifluoromethyl) benzenes and their derivatives which contain halogen atoms attached to the ring. The compounds concerned herein have the following structural formula:

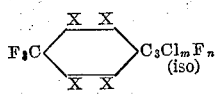

wherein $m$ is an integer from zero to six, inclusive; $n$ is an integer from seven to one, inclusive; the sum of $m$ plus $n$ being seven; and wherein X is either hydrogen or chlorine.

The compounds of this series, in general, are colorless liquids, insoluble in water, the lowest member of which, i. e., 1-heptafluoroisopropyl-4-(trifluoromethyl)benzene, boils at about 130 degrees centigrade. Other members of the series boil at successively higher temperatures depending upon the number of chlorine atoms therein. All of the compounds have relatively low freezing points, e. g., —7 to —61 degrees centigrade, and exhibit stability in the presence of aluminum foil and water.

The compounds, in general, may be prepared by the photochemical chlorination of the side chains of para-cymene or para-(chloromethyl)-isopropylbenzene and the subsequent replacement of chlorine by fluorine in such a manner that the number of fluorine atoms in the methyl group is three and the number of fluorine atoms in the isopropyl group is from one to seven, inclusive. The chlorination may be conducted at a moderately elevated temperature, for example, 175 degrees centigrade, in the presence of actinic light. Fluorination may be effected in any one of several ways, e. g., by reaction of the chlorinated product with hydrogen fluoride in the presence of antimony pentachloride or with antimony trifluoride and a pentavalent antimony salt.

To obtain ring-chlorinated derivatives, e. g., 1 - perhaloisopropyl - 4 - (trihalomethyl) chlorobenzenes the 1 - heptachloroisopropyl - 4 - (trichloromethyl)benzene may be further chlorinated in the presence of ferric chloride and the resulting products may be subsequently fluorinated. The organic reaction product may then be washed with dilute acid and with water, steam-distilled, dried, and rectified, or treated in any other suitable manner to identify or separate the desired compounds.

The following examples illustrate several ways in which members of this new class of compounds may be prepared, but are not to be construed as limiting.

Example 1

Five hundred milliliters of para-cymene was placed in a vertical chlorination tube, comprising a four-foot length of 51-millimeter glass tubing equipped with a gas dispersion disc, reflux condenser and thermometer. Illumination was provided by two banks of incandescent light bulbs placed on either side of the tube. Chlorine was introduced continuously at a rate of about two moles per hour. After a short induction period, the reaction mixture was cooled by lowering the tube into an ice-water bath. After three hours, the ice was allowed to melt, and the reaction was continued in a water bath for an additional twelve-hours. The tube was then removed from the bath and the reaction temperature gradually raised to about 175 degrees centigrade until chlorination was complete. 1-heptachloroisopropyl - 4 - (trichloromethyl) benzene was obtained from the reaction mixture and purified by crystallization from a mixture of benzene and methanol.

Two hundred forty grams of the 1-heptachloroisopropyl - 4 - (trichloromethyl) benzene, 180 grams of antimony trifluoride and 100 grams of antimony-dichlorofluoride were introduced into an iron reactor fitted with an air-cooled iron condenser. The mixture was heated at 200 degrees centigrade for twelve hours, after which the organic product was washed with hydrochloric acid and with water until free from antimony salts, distilled under reduced pressure, and rectified. The rectification yielded three main products: (a) 1-heptafluoroisopropyl-4-(trifluoromethyl)benzene, boiling at 130 degrees centigrade at 748 millimeters of mercury pressure absolute, having a freezing point of —21 degrees centigrade, a refractive index at 20 degrees centigrade of 1.3861, a specific gravity at 26/4 of 1.4127, and a fluorine analysis of 60.2 per cent compared to the theoretical value of 60.5 per cent; (b) 1-chlorohexafluoroisopropyl-4-(trifluoromethyl)benzene; and, (c) 1-dichloropentafluoroisopropyl-4-(trifluoromethyl)benzene.

Example 2

One kilogram of 1-heptachloroisopropyl-4-(trichloromethyl)benzene, prepared in a manner analogous to that outlined in Example 1, and 1 kilogram of antimony pentachloride were placed in a three-liter nickel pot equipped with stirrer, inlet tube, and a nickel dephlegmator. The reaction mixture was heated to 100 degrees centigrade and 800 grams of hydrogen fluoride was introduced into the reactor at a rate of 330 grams per hour. Effluent gases were led into a collection train comprising two copper traps connected in series, the first cooled with air and the second cooled in a trichloroethylene-Dry Ice bath. In this way loss of organic material through entrainment was minimized. When all of the hydrogen fluoride had been introduced, three moles of chlorine was allowed to enter the reactor over a thirty-five minute period. An additional 200 grams of hydrogen fluoride was then passed into the reaction mixture, and a temperature of 220° centigrade was maintained therein for an additional three-hour period. The resulting products were removed from the collection train, washed with concentrated hydrochloric acid and with water, and steam-distilled. The crude organic layer, weighing 520 grams, was then dried and rectified. The following compounds were obtained from the rectification:

wherein $m$ is an integer from zero to six, inclusive; $n$ is an integer from seven to one inclusive; the sum of $m$ plus $n$ being seven; and wherein X is selected from the group consisting of hydrogen and chlorine.

2. 1 - heptafluoroisopropyl - 4 - (trifluoromethyl) benzene.

3. A 1-dichloropentafluoroisopropyl-4-(trifluoromethyl) benzene, $CF_3-C_6H_4-C_3F_5Cl_2$.

4. A 1-trichlorotetrafluoroisopropyl-4-(trifluoromethyl) chlorobenzene, $CF_3-C_6H_3Cl-C_3F_4Cl_3$.

EARL T. McBEE.
OGDEN R. PIERCE.

| Compound | B. P., °C. | F. P., °C. | $n_D$ 20° C. | Sp. G. 26/4 | Cl, percent | | F, percent | |
|---|---|---|---|---|---|---|---|---|
| | | | | | Theor. | Fd. | Theor. | Fd. |
| 4-$CF_3C_6H_4$-iso$C_3ClF_6$ | 161.5 (748 mm.) | −61.0 | 1.4095 | 1.4346 | 10.7 | 10.6 | 51.7 | 50.9 |
| 4-$CF_3C_6H_4$-iso$C_3Cl_2F_5$ | 190.0 (751 mm.) | glass −60 | 1.4292 | 1.5243 | 20.5 | 20.6 | 43.8 | 42.7 |
| 4-$CF_3C_6H_4$-iso$C_3Cl_3F_4$ | 219.0 (751 mm.) | glass −40 | 1.4609 | 1.5617 | 29.3 | 29.6 | 36.6 | 35.3 |
| 4-$CF_3C_6H_4$-iso$C_3Cl_4F_3$ | 240.0 (748 mm.) | glass −30 | 1.4928 | 1.6163 | 37.4 | 37.4 | 30.1 | 29.8 |
| 4-$CF_3C_6H_3Cl$-iso$C_3Cl_3F_4$ | 236.2 (748 mm.) | glass −20 | 1.4780 | 1.5996 | 35.7 | 35.4 | 33.4 | 32.6 |
| 4-$CF_3C_6H_2Cl_2$-iso$C_3Cl_3F_4$ | 259.0 (748 mm.) | glass −10 | 1.4972 | 1.6180 | 41.0 | 40.8 | 30.8 | 29.9 |

The compounds concerned herein are useful as chemical intermediates, heat transfer fluids, dielectrics, and the like.

We claim:

1. A halodialkylbenzene having the following structural formula:

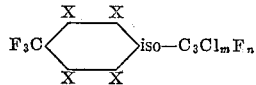

REFERENCES CITED

The following references are of record in the file of this patent:

UNITED STATES PATENTS

| Number | Name | Date |
|---|---|---|
| 2,005,712 | Holt et al. | June 18, 1935 |
| 2,121,330 | Scherer et al. | June 21, 1938 |
| 2,174,512 | Holt et al. | Oct. 3, 1939 |
| 2,378,453 | Weinmayr | June 19, 1945 |